Feb. 6, 1962  E. A. MARKS  3,020,504
PRESSURE TRANSDUCER
Filed Dec. 24, 1958  2 Sheets-Sheet 1

INVENTOR.
EUGENE A. MARKS
BY Herbert E. Kidder
AGENT

Feb. 6, 1962  E. A. MARKS  3,020,504
PRESSURE TRANSDUCER
Filed Dec. 24, 1958  2 Sheets-Sheet 2
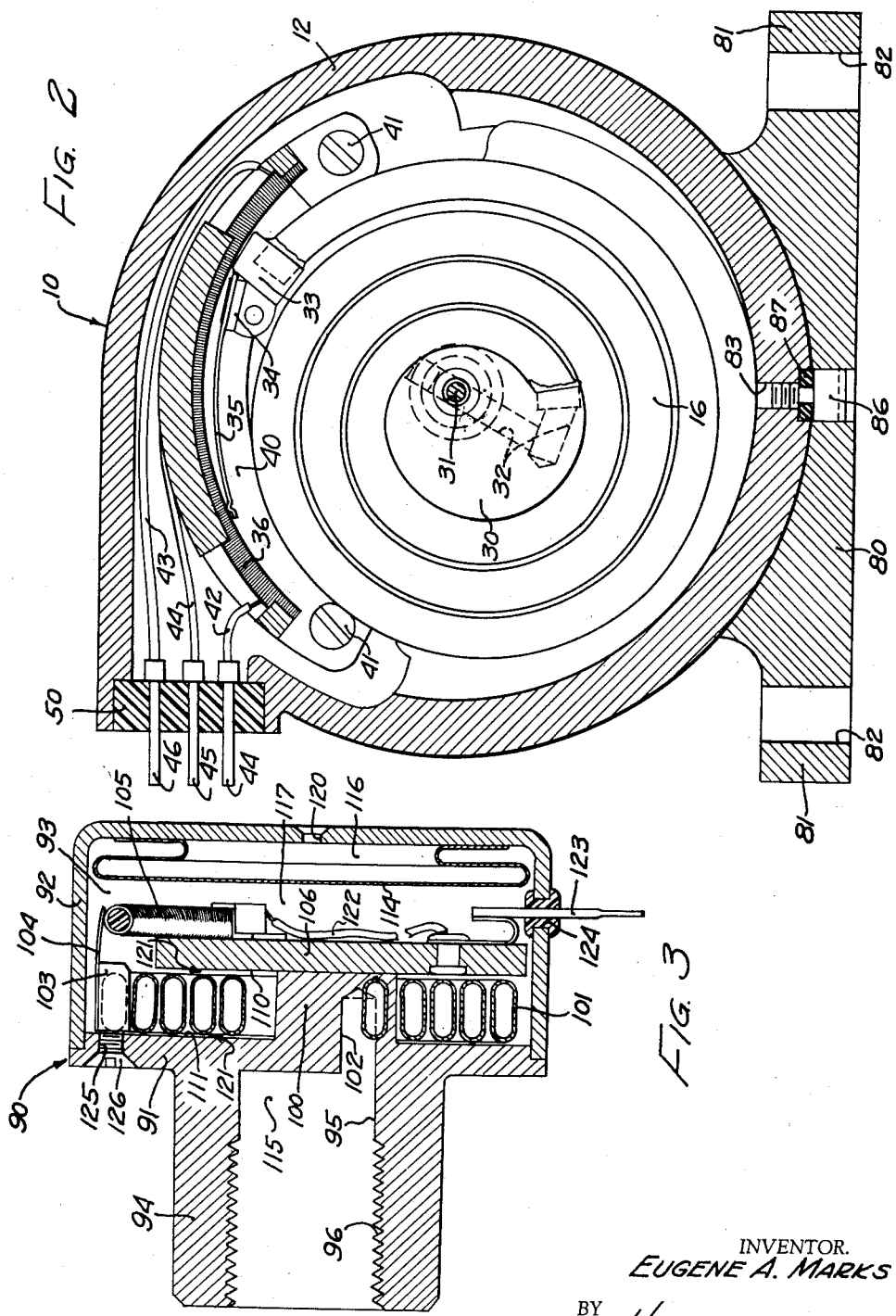
INVENTOR.
EUGENE A. MARKS
BY Herbert E. Kidder
AGENT

United States Patent Office 3,020,504
Patented Feb. 6, 1962

3,020,504
PRESSURE TRANSDUCER
Eugene A. Marks, Arlington, Calif., assignor to
Bourns, Inc., a corporation of California
Filed Dec. 24, 1958, Ser. No. 782,959
17 Claims. (Cl. 338—40)

The present invention relates to pressure transducers, and its primary object is to provide a new and improved pressure responsive instrument which is characterized by extremely low vibration and temperature errors, high resolution, and relative immunity to high overpressure.

More specifically, one important object of the invention is to provide a Bourdon tube type of pressure transducer of novel construction, which has a wide range of travel at the free end of the Bourdon tube, thereby making it possible to obtain high resolution without mechanical linkages or other multiplying means.

Another object of the invention is to provide a fluid-damped spiral Bourdon tube transducer, wherein the sides of the Bourdon tube cooperate with certain surfaces in the instrument case to provide restrictive orifices through which the fluid is forced by vibratory movement of the Bourdon tube; the resistance to fluid flow due to said orifices serving to damp out such vibratory movement.

A further object of the present invention is to provide a pressure transducer of the class described, which is capable of withstanding severe overpressure without damage to the Bourdon tube or other operating mechanism of the instrument.

Still another object of the invention is to provide a fluid-damped, Bourdon tube type of pressure transducer, wherein both the damping fluid and the operating mechanism are completely isolated from the pressure media, thereby making it possible to use the instrument with fluids which are highly corrosive or otherwise not compatible with the operating mechanism or damping means of the instrument.

Another object of the invention is to provide an oil-filled pressure transducer of the class described, which is fully compensated for temperature error due to thermal expansion or contraction of the oil in the instrument.

These and other objects of the present invention will become apparent to those skilled in the art upon consideration of the following detailed description of the embodiments illustrated in the accompanying drawings. These embodiments represent only two applications of the principles of the invention, and it will be understood that various other forms of transducer may be derived from the principles of the invention.

FIGURE 2 is a cross sectional view of the same, taken at 2—2 in FIGURE 1; and

FIGURE 3 is a sectional view similar to FIGURE 1, showing an oil-filled transducer without temperature compensation and without overpressure protection.

Figure 1:
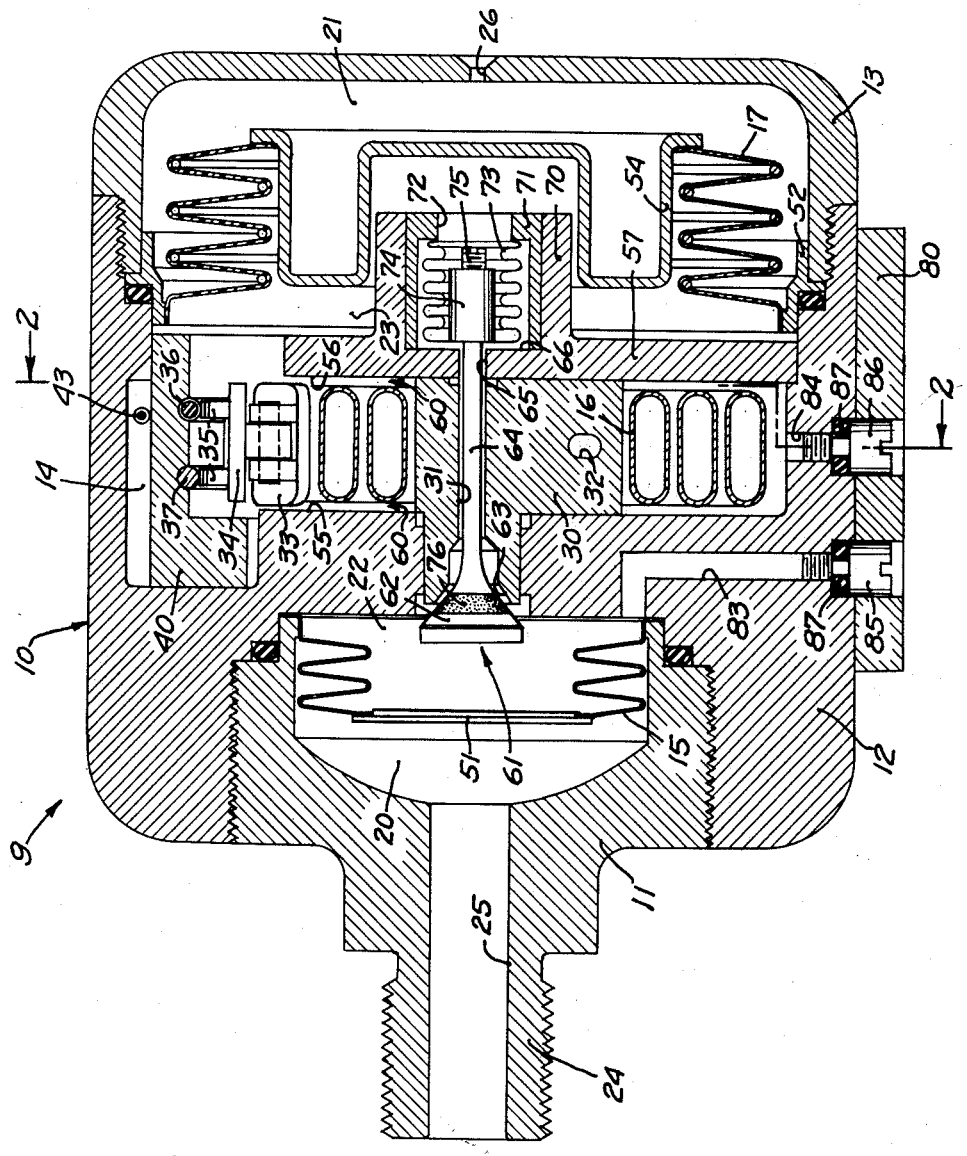
FIGURE 1 illustrates an oil-filled transducer having full temperature compensation for thermal expansion or contraction of the oil, and an integral cut-off valve for overpressure protection.

Basically, both instruments comprise a case having an enclosed cavity therein which is divided by flexible partition means into outer and intermediate chambers, the outer chambers being pressurized to different pressures, and the intermediate chamber or chambers being oil-filled and having the electrical mechanism and damping means contained therein. In both instances, one of the flexible partition means is comprised of a spiral Bourdon tube for high resolution, the interior of said Bourdon tube being pressurized by the fluid media with which the instrument is used. Also common to both embodiments is an oil-filled intermediate chamber in which the Bourdon tube cooperates with parallel surfaces of the case to provide an orifice damping effect for the purpose of damping out vibratory movement of the Bourdon tube. The embodiment of FIGURE 1 is distinguished from the embodiment of FIGURE 3 in two respects: (1) there is an additional flexible partition means which divides the cavity into two oil-filled intermediate chambers, instead of just one; the additional intermediate chamber being on the high pressure side of the Bourdon tube and including the interior thereof; and (2) there is an integral cut-off pressure valve which protects the Bourdon tube against damage due to overpressure. The purpose of the additional oil-filled chamber and flexible partition means on the high pressure side of the Bourdon tube is to provide temperature compensation for thermal expansion and contraction of the oil in the intermediate chambers. Since this temperature compensation function may be omitted without affecting the other desirable characteristics of the transducer, the intermediate chamber on the high pressure side of the Bourdon tube may be considered as the outer chamber on the high pressure side, for the purpose of some of the claims; while the spiral Bourdon tube may, in some claims be referred to as a "first flexible partition means," and in other claims directed to the temperature compensation feature, the spiral Bourdon tube may be referred to as the "second flexible partition means."

Referring now to FIGURES 1 and 2 of the drawings, the transducer is designated in its entirety by the reference numeral 9, and comprises a case 10 made up of three sections 11, 12 and 13, which are screwed together to form a generally cylindrical housing. Within the case 10 is an enclosed cavity 14 which is divided by first, second and third flexible partition means 15, 16 and 17, respectively, into first and second outer chambers 20 and 21, respectively, and first and second intermediate chambers 22 and 23, respectively.

Projecting axially from the center of the end section 11 is a threaded fitting 24 which is connected by a passage way 25 to the first outer chamber 20. The fitting 24 is adapted to be connected to a source of fluid under pressure with which the instrument is to be used. The second outer chamber 21 may be connected to the atmosphere by an orifice 26 if the instrument is to measure gage pressures, or it may be sealed and evacuated to a high vacuum for absolute pressure measurements, or provided with a fitting similar to 24 and connected to a second source of fluid pressure, if the instrument is to measure pressure differential.

The second flexible partition means 16 is preferably in the form of a spiral Bourdon tube, one end of which is attached to a mounting member 30 which is secured to the case member 12. The mounting member 30 is drilled centrally to form a passage way 31, and intersecting this is another passage way 32 which opens into the interior of the Bourdon tube.

The free outer end of the Bourdon tube is closed by a cap 33, to which is attached a supporting member 34 of dielectric material. Mounted on the supporting member 34 is a U-shaped wiper 35 of spring tempered copper or the like, one finger of which wipes on a resistance element 36, while the other finger wipes on a collector strip 37. Both the element 36 and collector strip 37 are arcuately curved about the center of the case, and they are mounted upon a supporting plate 40 which is secured by screws 41 to the case section 12. Terminal wires 42 and 43 are connected to the ends of the resistance elements, and a third terminal wire 44 is connected to the collector strip 37. The wires 42, 43 and 44 are connected to terminal pins 44, 45 and 46 which project through a dielectric plate 50 that is firmly secured in the housing section 12.

As will be noted in FIGURE 1, the flexible partition means 15 and 17 each consists of a thin-walled bellows, which may be of spring metal or any suitable elastomeric material such as neoprene. The bellows 15 is attached at one end to the case member 11, while the other end thereof is closed by a plate 51. The other bellows 17 is likewise attached at one end to a ring 52 which is clamped between the case sections 12 and 13, and the free end of the bellows is closed by a closure member 54. Both of the intermediate chambers 22 and 23, including the interior of the Bourdon tube 16, are filled with silicone oil or other suitable fluid, which serves to damp out vibratory movement of the Bourdon tube, as well as to isolate the electrical mechanism from the pressure media.

The oil in chamber 23 has the dual function of damping out vibratory movement of the Bourdon tube in the plane of its spiral, as will be explained in more detail presently, and of isolating the electrical mechanism from the pressure media on the low pressure side. However, thermal expansion of this oil in chamber 23 causes the bellows 17 to deflect as it accommodates the volumetric change in the oil. The pressure required to deflect the bellows 17 is thus added to the pressure in outer chamber 21, which means that the Bourdon tube "sees" a pressure that is slightly greater than the pressure in the outer chamber 21, and as a result, the deflection of the Bourdon tube is reduced slightly from what it should be for a given differential between the pressures in outer chambers 20 and 21. This deviation of Bourdon tube deflection due to thermal expansion of the oil in chamber 23 is known as temperature error, and is eliminated in the present invention by producing an equal and opposite "bucking" pressure, created by thermal expansion of the oil in chamber 22 acting against bellows 15. To accomplish this, the bellows 15 should be so selected that its resistance to deflection due to the expansion of the oil in chamber 22 is equal to the resistance of bellows 17 to deflection due to expansion of the oil in chamber 23. Thus, if the volume of the oil in chamber 22 is half the volume of oil in chamber 23, the deflection of bellows 15 should be half the deflection of bellows 17.

Vibration damping of the Bourdon tube is accomplished in a novel manner by means of two parallel surfaces 55 and 56 which are disposed on opposite sides of the Bourdon tube. Surface 55 is a flat surface on the case section 12, while surface 56 is the inner surface of a plate 57 that is secured to the mounting member 30. The two surfaces 55 and 56 are spaced closely adjacent the edges of the Bourdon tube, so as to provide restrictive orifices 60 therebetween, through which fluid is forced as the coils of the Bourdon tube vibrate in the plane of its spiral. As best shown in FIGURES 1 and 3, the clearance between the edges of the Bourdon tube and the surfaces 55, 56, is about one-fifteenth the width of the Bourdon tube, which is around 6 to 7 percent of the width, although it could be considerably less. The smaller the clearance, the more effective is the damping effect, as it is essential that the orifices 60 be sufficiently small with respect to the volume of flow to produce a substantial throttling effect on the fluid flow from one side of a coil to the other. The resistance to fluid flow due to the orifices 60 provides an extremely effective damping effect on the Bourdon tube, and instruments embodying the principles of the invention have been vibrated up to 35 G at 2000 cycles per second with negligible vibration error.

The Bourdon tube is protected against damage due to over-pressure by means of a pressure cut-off valve 61. The valve 61 has a head 62 which seats on a conical seat 63 formed in the member 30 at the end of the passage way 31. The valve 61 also has a stem 64 which extends through the passage way 31 and through an opening 65 in the plate 57.

The right-hand end of the valve stem 64 projects into a cavity 66 formed in a central boss 70 projecting outwardly from the plate 57. Seated within the cavity 66 is a cup-shaped member 71 having an aperture 72 in the end thereof. A small bellows 73 is disposed within the cup-shaped member 71, and the one end of the bellows is attached thereto around the edges of the aperture 72. The other end of the bellows 73 is attached to the left-hand end of a cylindrical nut 74 which is screwed onto the threaded end 75 of the valve stem. The end of the valve stem is slotted to take a screwdriver, so that the valve 61 can be adjusted to seat on the valve seat 63 when the bellows 73 has deflected a predetermined amount. Inasmuch as both the Bourdon tube 16 and the bellows 73 are acted upon by the oil in chamber 22, the said Bourdon tube and bellows may be considered to be arranged in parallel, and both of them function as part of the same flexible partition means separating the first intermediate chamber 22 from the second intermediate chamber 23.

The operation of the pressure cut-off valve 61 is as follows: pressure exerted by fluid admitted to the first outer chamber 20 is transmitted through the bellows 15 to the oil in the first intermediate chamber 22. Normally, the cut-off valve 61 is open, admitting fluid pressure to the Bourdon tube and to the cavity 66, where it acts against the bellows 73. The valve 61 remains open for the full operating range of the Bourdon tube. As the pressure increases beyond the maximum for full scale reading by the Bourdon tube, the bellows 73 yields to the right, allowing the valve head 62 to close against the seat 63, which closes the Bourdon tube 16 and the bellows 73 against any further increase in pressure exerted by the fluid media in chamber 20. The valve head 62 is preferably provided with a sealing ring 79 of elastomeric material, such as neoprene, which enables it to seal the passage way 31 against leakage. Any increase in pressure of the oil acting against the head 62 of the valve tends to press the valve head tighter against the seat, which makes for a tighter seal. As the pressure in chamber 20 and bellows 15 drops below the valve-closing pressure, the spring action of the bellows 73 opens the valve 61, and the Bourdon tube 16 and the bellows 73 are again pressurized to the same pressure as chamber 20.

One requirement of the two bellows 15 and 17 is that they be considerably less resistant to deflection under fluid pressure than the Bourdon tube 16. The reason for this is that the force required to deflect the bellows 15 and 17 is added to the force required to deflect the Bourdon tube 16, and since the linearity of the spring constant of the bellows is quite different from the linearity of the spring constant of the Bourdon tube, the resultant sum of their linearity characteristics may result in an objectionable linearity error in the instrument. By holding the spring constant of the bellows 15 and 17 to a relatively low value compared to that of the Bourdon tube, the effects of the linearity characteristics of the bellows on the linearity characteristics of the Bourdon tube is minimized, and becomes almost negligible. By way of example, the resistance of the bellows 15 and 17 to deflection is preferably less than 1% of the resistance of the Bourdon tube 16 to deflection, although it may be considerably more under certain circumstances.

The case 10 is brazed or otherwise secured on a mounting base 80 having laterally projecting flanges 81 that are drilled at 82 to receive mounting bolts. The case section 12 is drilled at 83 and 84 to provide oil filling holes; passage way 83 extending into the first intermediate chamber 22, and passage way 84 extending into the second intermediate chamber 23. The two oil filler passage ways 83 and 84 are closed by screw plugs 85 and 86, which are sealed by O rings 87.

The operation of the embodiment shown in FIGURES 1 and 2 is believed to be more or less self evident from the foregoing description. Pressure of the fluid media introduced into chamber 20 is applied through the bellows 15 to the oil in chamber 22 and the interior of the spiral Bourdon tube 16. By virtue of its spiral configuration, the Bourdon tube 16 provides a wide range of travel at the free end thereof, enabling the wiper 35 to travel from one end of the resistance element 36 to the other end thereof within the operating range of the Bourdon tube. This provides high resolution without the use of linkages or other multiplying devices, and as a result is relatively free of friction. The parallel surfaces 55 and 56 provide an orifice damping effect on the coils of the Bourdon tube, effectively damping out practically all vibration of the Bourdon tube coils in the plane of its spiral. The overpressure valve 61 protects the Bourdon tube against overpressure, and the two belloys 15 and 17 enclosing the oil-filled chambers 22 and 23 provide full temperature compensation for error due to thermal expansion of the oil in the chambers.

Where temperature compensation is not essential, and the overpressure protection of valve 61 is not required, a somewhat simpler transducer may be used, which still embodies the other desirable characteristics of the present invention. A transducer of this kind is illustrated in FIGURE 3 to which attention is now directed.

In FIGURE 3, the instrument case is designated by the reference numeral 90, and comprises base member 91 to which a cup-shaped cover 92 is attached, forming an enclosed cavity 93. Projecting from the outer side of the base member 91 is a boss 94, which is apertured at 95 and threaded at 96 to receive a pipe fitting. Projecting into the cavity 93 from the inner side of the member 91 is a boss 100, to which the inner end of a spiral Bourdon tube 101 is connected. The interior of the Bourdon tube 101 is connected to the aperture 95 by a passage way 102, so that pressure admitted to the aperture 95 is introduced into the interior of the Bourdon tube. The outer end of the spiral Bourdon tube 101 is closed by a cap 103 of dielectric material, which carries a laterally projecting spring contact finger 104 that wipes on a resistance element 105. The element 105 is attached to a plate 106, which is secured to the outer end of the boss 100 and which provides one of the flat surfaces 110 along one side and closely adjacent to the spiral Bourdon tube 101. The other flat surface 111 is a surface of the member 91, and the two surfaces 110, 111 cooperate with the spiral Bourdon tube 101 to produce the orifice damping effect mentioned in connection with the first embodiment. The Bourdon tube 101 constitutes a first flexible partition means which cooperates with a second flexible partition means 114 to divide the cavity 93 into a first outer chamber 115, a second outer chamber 116, and an intermediate chamber 117. In this instance, the interior of the Bourdon tube 101 constitutes a part of the first outer chamber, and the fluid media with which the instrument is to be used, enters and fills the Bourdon tube 101. The second outer chamber 116 may be opened to the atmosphere through an orifice 120, as in FIGURE 3, if the instrument is to measure gage pressure; or it may be sealed and evacuated to a high vacuum to measure absolute pressure, or it may be provided with a fitting and connected to a low pressure source of fluid media if it is to measure differential pressure.

As in the first embodiment, the intermediate chamber 117 is filled with silicone oil or its equivalent, which has the dual function of isolating the electrical mechanism from the low pressure fluid media, and of providing the damping function for restraining the Bourdon tube coils against vibrating in the plane of their spiral. The parallel surfaces 110 and 111 are spaced closely adjacent the edges of the Bourdon tube 101 to provide restrictive orifices 121 therebetween through which the silicone oil is forced by vibratory movement of the Bourdon tube coils. The resistance to fluid flow through the orifices 121 has a powerful damping effect on the vibrating Bourdon tube coils, and as a result, the instrument is capable of withstanding extremely severe vibration without objectionable vibration error.

The ends of the resistance element 105 are connected by terminal wires 122 to terminal pins 123, which extend through insulators 124 in the side of the cover 92. Only one such terminal pin is seen in FIGURE 3, although it will be understood that there are normally three of these terminal pins, two of which are connected to the ends of the element 105 and the third being connected to the wiper 104. The wire connecting the wiper 104 to a terminal pin is not shown. An oil fill hole 125 is provided in the base member 91, and this is closed by a screw plug 126.

The operation of this embodiment is substantially the same as in the first embodiment. Fuid pressure media introduced into the first outer chamber 115, enters the Bourdon tube 101. The Bourdon tube deflects with fluid pressure, causing the wiper 104 to travel from one end of the resistance element 105 toward the other end thereof. The fluid pressure in the intermediate chamber 117 is a function of the pressure in the second outer chamber 116 and the resistance of the bellows 114 to deflection due to volumetric change of the silicone oil in intermediate chamber 117 with temperature change. In this embodiment, expansion and contraction of the oil in the intermediate chamber 117 causes the bellows 114 to deflect, and the force required to deflect this bellows is added to the pressure seen by the Bourdon tube. This is minimized by selecting the bellows 114 so that its resistance to deflection due to volumetric change in the oil is quite small compared to the resistance of the Bourdon tube to deflection.

While I have shown and described in considerable detail what I believe to be the preferred embodiments of the present invention, it will be understood by those skilled in the art that various changes may be made in the shape and arrangement of the several parts without departing from the scope of the appended claims.

I claim:

1. A pressure responsive instrument comprising a case having an enclosed cavity provided therein, first and second flexible partition means dividing said cavity into first and second outer chambers separated by an intermediate chamber, said first flexible partition means between said intermediate chamber and said first outer chamber being considerably stiffer than said second flexible partition means, said first outer chamber being pressurized to a higher pressure than said second outer chamber, said intermediate chamber being filled with fluid and its pressure being a function of the pressure in said second outer chamber and the resistance of said second flexible partition means to deflection caused by thermal expansion of said fluid, means within said intermediate chamber cooperating with said fluid to restrain said first flexible partition means against movement relative to said case responsive to vibration, a resistance element mounted on said case within said intermediate chamber, a movable contact connected to said first flexible partition means and wiping on said element to produce an electrical signal that is a function of the difference between the pressures in said first and second outer chambers, and terminal means connected to said resistance element and to said movable contact.

2. A pressure responsive instrument comprising a case having a fluid filled chamber provided therein, a spiral Bourdon tube mounted on said case within said chamber, said case having a pair of spaced parallel surfaces disposed on opposite sides of said Bourdon tube closely adjacent thereto, said surfaces cooperating with the edges of said spiral Bourdon tube to provide restricted orifices therebetween through which fluid is forced by vibratory movement of said Bourdon tube in the plane of its spiral, the dimensions of said restricted orifices being such as to produce a substantial throttling effect on the flow of fluid from one side of a coil of said Bourdon tube to the other, the resistance to fluid flow due to said orifices serving to damp out said vibratory movement, a resistance element mounted within said fluid filled chamber, a movable contact connected to the free end of said Bourdon tube and wiping on said element, and terminal means connected to said resistance element and to said movable contact.

3. A pressure responsive instrument comprising a case having an enclosed cavity provided therein, first and second flexible partition means dividing said cavity into first and second outer chambers separated by an intermediate chamber, said first flexible partition means comprising a spiral Bourdon tube, the interior of which constitutes said first outer chamber, the space between the outside of said Bourdon tube and said second flexible partition means constituting said intermediate chamber, said Bourdon tube being considerably more resistant to deflection under fluid pressure than said second flexible partition means, said first outer chamber being pressurized to a higher pressure than said second outer chamber, said intermediate chamber being filled with fluid and its pressure being a function of the pressure in said second outer chamber and the resistance of said second flexible partition means to deflection caused by thermal expansion of said fluid, means within said intermediate chamber cooperating with said fluid to restrain said Bourdon tube against movement relative to said case responsive to vibration, a resistance element mounted on said case within said intermediate chamber, a movable contact connected to the free end of said Bourdon tube and wiping on said element to produce an electrical signal that is a function of the difference between the pressures in said first and second outer chambers, and terminal means connected to said resistance element and to said movable contact.

4. A pressure responsive instrument comprising a case having an enclosed cavity provided therein, first and second flexible partition means dividing said cavity into first and second outer chambers separated by an intermediate chamber, said first flexible partition means comprising a spiral Bourdon tube, the interior of which constitutes said first outer chamber, the space between the outside of said Bourdon tube and said second flexible partition means constituting said intermediate chamber, said Bourdon tube being considerably more resistant to deflection under fluid pressure than said second flexible partition means, said first outer chamber being pressurized to a higher pressure than said second outer chamber, said intermediate chamber being filled with fluid and its pressure being a function of the pressure in said second outer chamber and the resistance of said second flexible partition means to deflection caused by thermal expansion of said fluid, said case having a pair of parallel surfaces provided within said intermediate chamber which are spaced apart to receive said spiral Bourdon tube between them, said surfaces being disposed closely adjacent the edges of said Bourdon tube so as to provide restricted orifices therebetween through which said fluid is forced by movement of said Bourbon tube relative to said case, the resistance to fluid flow due to said orifices serving to damp out any vibratory movement of said Bourdon tube, a resistance element mounted on said case within said intermediate chamber, a movable contact connected to the free end of said Bourdon tube and wiping on said element to produce an electrical signal that is a function of the difference between the pressures in said first and second outer chambers, and terminal means connected to said resistance element and to said movable contact.

5. A pressure responsive instrument comprising a case having an enclosed cavity provided therein, first, second and third flexible partition means dividing said cavity into first and second outer chambers and first and second intermediate chambers, said first outer chamber and said first intermediate chamber being separated by said first flexible partition means, said first and second intermediate chambers being separated by said second flexible partition means, said second intermediate chamber and said second outer chamber being separated by said third flexible partition means, said second flexible partition means being considerably stiffer than said first and third flexible partition means, said first outer chamber being pressurized to a higher pressure than said second outer chamber, said first and second intermediate chambers being filled with fluid, the pressure of said first intermediate chamber being a function of the pressure in said first outer chamber and the resistance of said first flexible partition means to deflection caused by thermal expansion of said fluid in said first intermediate chamber, the pressure of said second intermediate chamber being a function of the pressure in said second outer chamber and the resistance of said third flexible partition means to deflection caused by thermal expansion of said fluid in said second intermediate chamber, means within one of said intermediate chambers cooperating with the fluid therein to restrain said second flexible partition means against movement relative to said case responsive to vibration, a resistance element mounted within one of said intermediate chambers, a movable contact connected to said second flexible partition means and wiping on said element to produce an electrical signal that is a function of the difference between the pressures in said first and second outer chambers, and terminal means connected to said resistance element and to said movable contact.

6. A pressure responsive instrument comprising a case having an enclosed cavity provided therein, first, second and third flexible partition means dividing said cavity into first and second outer chambers and first and second intermediate chambers, said first outer chamber and said first intermediate chamber being separated by said first flexible partition means, said first and second intermediate chambers being separated by said second flexible partition means, said second intermediate chamber and said second outer chamber being separated by said third flexible partition means, said second flexible partition means comprising a spiral Bourdon tube, the interior of which constitutes at least a portion of said first intermediate chamber, the space between the outside of said Bourdon tube and said third flexible partition means constituting said second intermediate chamber, said Bourdon tube being considerably more resistant to deflection under fluid pressure than said first and third flexible partition means, said first outer chamber being pressurized to a higher pressure than said second outer chamber, said first and second intermediate chambers being filled with fluid, the pressure of said first intermediate chamber being a function of the pressure in said first outer chamber and the resistance of said first flexible partition means to deflection caused by thermal expansion of said fluid in said first intermediate chamber, the pressure of said second intermediate chamber being a function of the pressure in said second outer chamber and the resistance of said third flexible partition means to deflection caused by thermal expansion of said fluid in said second intermediate chamber, means within one of said intermediate chambers cooperating with the fluid therein to restrain said Bourdon tube against movement relative to said case responsive to vibration, a resistance element mounted on said case within said second intermediate chamber, a movable contact connected to the free end of said Bourdon tube and wiping on said element to produce an electrical signal that is a function of the difference between the pressures in said first and second outer chambers, and terminal means connected to said resistance element and to said movable contact.

7. A pressure responsive instrument comprising a case having an enclosed cavity provided therein, first, second and third flexible partition means dividing said cavity into first and second outer chambers and first and second intermediate chambers, said first outer and said first intermediate chamber being separated by said first flexible partition means, said first and second intermediate chambers being separated by said second flexible partition means, said second intermediate chamber and said second outer chamber being separated by said third flexible partition means, said second flexible partition means comprising a spiral Bourdon tube, the interior of which constitutes at least a portion of said first intermediate chamber, the space between the outside of said Bourdon tube and said third flexible partition means constituting said second intermediate chamber, said Bourdon tube being considerably more resistant to deflection under fluid pressure than said first and third flexible partition means, said first outer chamber being pressurized to a higher pressure than said second outer chamber, said first and second intermediate chambers being filled with fluid, the pressure of said first intermediate chamber being a function of the pressure in said first outer chamber and the resistance of said first flexible partition means to deflection caused by thermal expansion of said fluid in said first intermediate chamber, the pressure of said second intermediate chamber being a function of the pressure in said second outer chamber and the resistance of said third flexible partition means to deflection caused by thermal expansion of said fluid in said second intermediate chamber, said case having a pair of parallel surfaces provided within said second intermediate chamber which are spaced apart to receive said spiral Bourdon tube between them, said surfaces being disposed closely adjacent the edges of said Bourdon tube so as to provide restricted orifices therebetween through which said fluid is forced by movement of said Bourdon tube relative to said case, the resistance to fluid flow due to said orifices serving to damp out any vibratory movement of said Bourdon tube, a resistance element mounted on said case within said second intermediate chamber, a movable contact connected to the free end of said Bourdon tube and wiping on said element to produce an electrical signal that is a function of the difference between the pressures in said first and second outer chambers, and terminal means connected to said resistance element and to said movable contact.

8. A pressure responsive instrument comprising a case having an enclosed cavity provided therein, first and second flexible partition means dividing said cavity into first and second outer chambers separated by an intermediate chamber, said first flexible partition means between said intermediate chamber and said first outer chamber being considerably stiffer than said second flexible partition means, said first outer chamber being pressurized to a higher pressure than said second outer chamber, said intermediate chamber being filled with fluid and its pressure being a function of the pressure in said second outer chamber and the resistance of said second flexible partition means to deflection caused by thermal expansion of said fluid, valve means responsive to a pressure differential between said first and second outer chambers for closing off said first flexible partition means from fluid pressure in excess of a predetermined value, so as to protect said first flexible partition means from damage due to overpressure, a resistance element mounted on said case within said intermediate chamber, a movable contact connected to said first flexible partition means and wiping on said element to produce an electrical signal that is a function of the difference between the pressures in said first and second outer chambers, and terminal means connected to said resistance element and to said movable contact.

9. A pressure responsive instrument comprising a case having an enclosed cavity provided therein, first and second flexible partition means dividing said cavity into first and second outer chambers separated by an intermediate chamber, said first flexible partition means including a spiral Bourdon tube, the interior of which constitutes said first outer chamber, the space between the outside of said Bourdon tube and said second flexible partition means constituting said intermediate chamber, said Bourdon tube being considerably more resistant to deflection under fluid pressure than said second flexible partition means, said first outer chamber being pressurized to a higher pressure than said second outer chamber, said intermediate chamber being filled with fluid and its pressure being a function of the pressure in said second outer chamber and the resistance of said second flexible partition means to deflection caused by thermal expansion of said fluid, valve means actuated by deflection of said first flexible partition means responsive to a pressure differential between said first and second outer chambers in excess of a predetermined value for closing off said first flexible partition means from further fluid pressure, so as to protect said first flexible partition means from damage due to overpressure, a resistance element mounted on said case within said intermediate chamber, a movable contact connected to the free end of said Bourdon tube and wiping on said element to produce an electrical signal that is a function of the difference between the pressures in said first and second outer chambers, and terminal means connected to said resistance element and to said movable contact.

10. A pressure responsive instrument comprising a case having an enclosed cavity provided therein, first, second and third flexible partition means dividing said cavity into first and second outer chambers and first and second intermediate chambers, said first outer chamber and said first intermediate chamber being separated by said first flexible partition means, said first and second intermediate chambers being separated by said second flexible partition means, said second intermediate chamber and said second outer chamber being separated by said third flexible partition means, said second flexible partition means including a spiral Bourdon tube, the interior of which constitutes at least a portion of said first intermediate chamber, the space between the outside of said Bourdon tube and said third flexible partition means constituting said second intermediate chamber, said Bourdon tube being considerably more resistant to deflection under fluid pressure than said first and third flexible partition means, said first outer chamber being pressurized to a higher pressure than said second outer chamber, said first and second intermediate chambers being filled with fluid, the pressure of said first intermediate chamber being a function of the pressure in said first outer chamber and the resistance of said first flexible partition means to deflection caused by thermal expansion of said fluid in said first intermediate chamber, the pressure of said second intermediate chamber being a function of the pressure in said second outer chamber and the resistance of said third flexible partition means to deflection caused by thermal expansion of said fluid in said second intermediate chamber, valve means actuated by deflection of said second flexible partition means responsive to a pressure differential between said first and second outer chambers in excess of a predetermined value for closing off said second flexible partition means from further fluid pressure, so as to protect said second flexible partition means from damage due to over-pressure, a resistance element mounted on said case within said second intermediate chamber, a movable contact connected to the free end of said Bourdon tube and wiping on said element to produce an electrical signal that is a function of the difference between the pressures in said first and second outer chambers, and terminal means connected to said resistance element and to said movable contact.

11. A pressure responsive instrument comprising a case having an enclosed cavity provided therein, first, second and third flexible partition means dividing said cavity into first and second outer chambers and first and second intermediate chambers, said first and third flexible partition means consisting of relatively resilient thin-walled bellows separating said first outer chamber from said first intermediate chamber, and said second outer chamber from said second intermediate chamber, respectively, said second flexible partition means comprising a relatively stiff spiral Bourdon tube and a relatively resilient valve-actuating bellows arranged in parallel and separating said first intermediate chamber from said second intermediate chamber, said first and second intermediate chambers being filled with fluid, said second intermediate chamber being provided with a pair of spaced parallel surfaces disposed on opposite sides of said spiral Bourdon tube closely adjacent thereto, said surfaces cooperating with the edges of said spiral Bourdon tube to provide restricted orifices therebetween through which fluid is forced by vibratory movement of said Bourdon tube in the plane of its spiral, the resistance to fluid flow due to said orifices serving to damp out said vibratory movement, valve means controlled by said valve-actuating bellows responsive to a pressure differential between said first and second outer chambers in excess of a predetermined value for closing off said second flexible partition means from fluid pressure so as to protect said spiral Bourdon tube and said valve-actuating bellows from damage due to overpressure, a resistance element mounted on said case within said second intermeriate chamber, a movable contact connected to the free end of said Bourdon tube and wiping on said element to produce an electrical signal that is a function of the difference between the pressures in said first and second outer chambers, and terminal means connected to said resistance element and to said movable contact.

12. A pressure responsive instrument comprising a case having an enclosed cavity provided therein, first and second flexible partition means dividing said cavity into first and second outer chambers separated by an intermediate chamber, said first flexible partition means between said intermediate chamber and said first outer chamber being considerably stiffer than said second flexible partition means, said first outer chamber being pressurized to a higher pressure than said second outer chamber, said intermediate chamber being filled with fluid and its pressure being a function of the pressure in said second outer chamber and the resistance of said second flexible partition means to deflection caused by thermal expansion of said fluid, a stationary electrical means connected to said case, and a movable electrical means connected to said first flexible partition means and movable thereby, said stationary electrical means and said movable electrical means cooperating to produce an electrical signal that is a function of the difference between the pressures in said first and second outer chambers.

13. A pressure responsive instrument comprising a case having a fluid filled chamber provided therein, a spiral Bourdon tube mounted on said case within said chamber, said case having a pair of spaced parallel surfaces disposed on opposite sides of said Bourdon tube closely adjacent thereto, said surfaces cooperating with the edges of said spiral Bourdon tube to provide restricted orifices therebetween through which fluid is forced by vibratory movement of said Bourdon tube in the plane of its spiral, the dimensions of said restrictive orifices being such as to produce a substantial throttling effect on the flow of fluid from one side of a coil of said Bourdon tube to the other, the resistance to fluid flow due to said orifices serving to damp out said vibratory movement, a stationary electrical means connected to said case, and a movable electrical means connected to the free end of said Bourdon tube, said stationary electrical means and said movable electrical means cooperating to produce an electrical signal that is a function of the difference in pressure between the inside and outside of said Bourdon tube.

14. A pressure responsive instrument comprising a case having a fluid filled chamber provided therein, a spiral Bourdon tube mounted on said case within said chamber, said case having a pair of spaced parallel surfaces disposed on opposite sides of said Bourdon tube closely adjacent thereto, said surfaces cooperating with the edges of said spiral Bourdon tube to provide restricted orifices therebetween through which fluid is forced by vibratory movement of said Bourdon tube in the plane of its spiral, said parallel surfaces being spaced from the edges of said spiral Bourdon tube a distance not more than about one-fifteenth the width of the Bourdon tube, whereby there is a substantial throttling effect on the flow of fluid from one side of a coil of said spiral Bourdon tube to the other, tending to damp out said vibratory movement, a stationary electrical means connected to said case, and a movable electrical means connected to the free end of said Bourdon tube, said stationary electrical means and said movable electrical means cooperating to produce an electrical signal that is a function of the difference in pressure between the inside and outside of said Bourdon tube.

15. A pressure responsive instrument comprising a case having a fluid filled chamber provided therein, a spiral Bourdon tube mounted on said case within said chamber, said case having a pair of spaced parallel surfaces disposed on opposite sides of said Bourdon tube closely adjacent thereto, said parallel surfaces being spaced apart a distance only slightly greater than the width of said Bourdon tube, whereby the edges of the Bourdon tube are disposed very closely adjacent said parallel surfaces and cooperate therewith to form a restrictive orifice through which said fluid is forced by said Bourdon tube when the latter is caused to vibrate within the plane of its spiral, said restrictive orifices being sufficiently small to produce a substantial throttling effect on the flow of fluid from one side of a coil of said Bourdon tube to the other so as to damp out said vibratory movement, a stationary electrical means connected to said case, and a movable electrical means connected to the free end of said Bourdon tube, said stationary electrical means and said movable electrical means cooperating to produce an electrical signal that is a function of the difference in pressure between the inside and outside of said Bourdon tube.

16. A pressure responsive instrument comprising a case having a fluid-filled chamber provided therein, a spiral Bourdon tube having a plurality of convolutions with one end mounted on said case within said chamber, all portions of said Bourdon tube beyond said end being movable with respect to said case, and stationary means perpendicular to the axis of said Bourdon tube within said chamber cooperating with said Bourdon tube to define a restrictive orifice through which fluid is forced by vibratory movement of said Bourdon tube in the plane of its spiral, said restrictive orifice producing a substantial throttling effect on the flow of fluid from one side of a coil of said Bourdon tube to the other, tending to damp out said vibratory movement.

17. A pressure responsive instrument comprising a case having a fluid-filled chamber provided therein, a spiral Bourdon tube having a plurality of convolutions with one end mounted on said case within said chamber, all portions of said Bourdon tube beyond said end being movable with respect to said case, said case including portions disposed closely adjacent the edges of said Bourdon tube and cooperating therewith to define restrictive orifices through which fluid is forced by vibratory movement of said Bourdon tube in the plane of its spiral, said restrictive orifices producing a substantial throttling effect on the flow of fluid from one side of a coil of said Bourdon tube to the other, tending to damp out said vibratory movement, a stationary electrical means connected to said case, and a movable electrical means connected to the free end of said Bourdon tube, said stationary electrical means and said movable electrical means cooperating to produce an electrical signal that is a function of the difference in pressure between the inside and outside of said Bourdon tube.

References Cited in the file of this patent
UNITED STATES PATENTS

| | | |
|---|---|---|
| 2,443,252 | Kelly | June 15, 1948 |
| 2,739,211 | De Julio | Mar. 20, 1956 |
| 2,908,881 | Pitzer | Oct. 13, 1959 |